United States Patent
Post, II

(10) Patent No.: US 7,689,337 B2
(45) Date of Patent: Mar. 30, 2010

(54) COOPERATIVE VEHICLE CONTROL SYSTEM

(75) Inventor: James W. Post, II, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 221 days.

(21) Appl. No.: 10/954,451

(22) Filed: Sep. 30, 2004

(65) Prior Publication Data

US 2006/0041360 A1    Feb. 23, 2006

Related U.S. Application Data

(60) Provisional application No. 60/507,334, filed on Sep. 30, 2003.

(51) Int. Cl.
*G06F 17/00* (2006.01)
*G05D 17/00* (2006.01)

(52) U.S. Cl. .............................. 701/48; 701/1; 701/36; 701/69

(58) Field of Classification Search ................. 701/48, 701/33, 36, 27, 1, 69, 77; 712/216; 717/136; 700/245, 249; 180/197
See application file for complete search history.

(56) References Cited

U.S. PATENT DOCUMENTS

| | | | |
|---|---|---|---|
| 4,954,957 A | | 9/1990 | Kawagoe et al. |
| 5,369,581 A | | 11/1994 | Ohsuga et al. |
| 5,481,456 A | * | 1/1996 | Ogura ............................ 701/1 |
| 5,515,282 A | * | 5/1996 | Jackson ......................... 701/4 |
| 5,699,250 A | | 12/1997 | Kobayashi |
| 5,991,669 A | * | 11/1999 | Dominke et al. ............... 701/1 |
| 6,038,505 A | * | 3/2000 | Probst et al. ................... 701/65 |
| 6,122,572 A | * | 9/2000 | Yavnai .......................... 701/23 |
| 6,154,688 A | | 11/2000 | Dominke et al. |
| 6,226,581 B1 | * | 5/2001 | Reimann et al. ............... 701/48 |
| 6,240,340 B1 | | 5/2001 | Minowa et al. |

(Continued)

FOREIGN PATENT DOCUMENTS

WO    03/059680    7/2003

(Continued)

OTHER PUBLICATIONS

J. Rosenblatt, DAMN: A Distributed Architecture for Mobile Navigation, Journal of Experimental and Theoretical Artificial Intelligence, vol. 9, No. 2 / 3, 1997, pp. 339-360.*

*Primary Examiner*—Thomas G Black
*Assistant Examiner*—Christine M Behncke
(74) *Attorney, Agent, or Firm*—Mark E. Duell; Rankin, Hill & Clark LLP

(57) ABSTRACT

A method of cooperative vehicle control in which a high level controller includes a high level algorithm that manages the overall control strategy of the vehicle and decides which vehicle subsystems to control, with what timing and with what authority. Depending on the given situation at hand, including existing or potential conflict between sub-algorithms in the high level controller, the status of the various subsystems and the effectiveness of additional change of these subsystems, desired intervention speed, and environmental repercussions in the total vehicle system, the high level controller may decide to use differing control strategies to meet performance characteristics of the total vehicle system as well as maintain control of vehicle stability, traction characteristics and overall body motions.

6 Claims, 2 Drawing Sheets

U.S. PATENT DOCUMENTS

| | | |
|---|---|---|
| 6,445,989 B2 | 9/2002 | Nishimura et al. |
| 6,453,226 B1 | 9/2002 | Hac et al. |
| 6,463,373 B2 | 10/2002 | Suganuma et al. |
| 6,553,297 B2 | 4/2003 | Tashiro et al. |
| 6,675,081 B2 | 1/2004 | Shuman et al. |
| 6,898,500 B2 * | 5/2005 | Kobayashi .................. 701/48 |
| 7,162,333 B2 * | 1/2007 | Koibuchi et al. ............... 701/1 |
| 7,274,981 B2 * | 9/2007 | Eriksson ..................... 701/37 |
| 2002/0143451 A1 | 10/2002 | Hac et al. |
| 2003/0055547 A1 | 3/2003 | Chen et al. |
| 2003/0088353 A1 | 5/2003 | Heckmann et al. |
| 2003/0225494 A1 | 12/2003 | Coelingh et al. |
| 2003/0225495 A1 | 12/2003 | Coelingh et al. |
| 2003/0225496 A1 | 12/2003 | Coelingh et al. |
| 2004/0030477 A1 | 2/2004 | Gerdes |
| 2004/0044443 A1 | 3/2004 | Eriksson |
| 2004/0083043 A1 | 4/2004 | Akiyama et al. |
| 2004/0083044 A1 | 4/2004 | Akiyama et al. |
| 2004/0128044 A1 | 7/2004 | Hac |
| 2004/0158377 A1 | 8/2004 | Matsumoto et al. |
| 2004/0162638 A1 * | 8/2004 | Solomon ..................... 700/247 |

FOREIGN PATENT DOCUMENTS

| | | |
|---|---|---|
| WO | 2005/063524 | 7/2005 |
| WO | 2005/068262 | 7/2005 |

* cited by examiner

COOPERATIVE VEHICLE CONTROL SYSTEM

PRIORITY CLAIM

This application claims priority to U.S. Provisional Application No. 60/507,334, filed on Sep. 30, 2003, the entirety of which is incorporated herein.

BACKGROUND OF THE INVENTION

Modern vehicle engineering has invested much time and effort, in recent years, towards solving the finer aspects of vehicle stability and traction control. Beginning with antilock brake control systems, newer controls including traction control, yaw moment control, and other forms of stability control have been developed and integrated into the braking control system to enhance overall vehicle stability and traction. At the same time, there has been a strong appearance of other controlled systems such as active suspension, active driveline control, active steering, etc. that are now being arranged on vehicles to enhance vehicle performance, maneuverability and secure driving impression. Many of these newer systems have capabilities to influence wheel slip, vehicle yaw, roll and pitch motions and have specific strategies of control. However, many of these systems may have differing strategies to control various vehicle response parameters and conditions and lend themselves to interference. That is to say that these various actuator systems (i.e., brake systems, throttle control systems, chassis damping systems, etc.) have been designed and implemented to work independently of one another despite being arranged on the same vehicle.

In the present state of the art, various control systems applied on the same vehicle generally operate with separate functionality and do not share more than minimal information to understand the status of other systems' functioning capability. In some cases actions of two control systems attempting to perform similar function or working in a similar domain of operation (such as controlling wheel slip, vehicle yaw rate, etc.) can have interference. As an example of this type of interference, consider a vehicle which is fitted with an electronic driveline system capable of generating wheel torques independently at each wheel and a brake-based stability control system also capable of generating wheel torques independently at each wheel. In various operational regimes, the electronic driveline system may be requesting various wheel torques in either a feed-forward and/or feedback manner, and simultaneously the brake-based control system is working to reduce wheel slip and/or excessive vehicle yawing motions. Depending on how the systems are calibrated it is possible to have interference wherein the driveline system attempts to increase wheel torque on a given wheel, while the brake system attempts to reduce the wheel torque. This situation occurs because each control system has different targets for wheel slip and/or yaw control using reference signals for the control that may not be calculated in the same manner, hence interference occurs.

What is desired is a system and method to control undesirable vehicle phenomena such as wheel slippage, wheel lockup and vehicle spinouts in harmony between various control and actuator systems. What is desired is a system and method where these systems, each benefit from the information and control of other subsystems in the vehicle. Further, if one system malfunctions, other systems should be able to compensate in some way.

BRIEF SUMMARY OF THE INVENTION

This invention describes the arrangement of a variety of system control and actuator systems in such a manner that all can benefit from shared information and a hierarchical control strategy. The basis of this approach is that a top level electronic control unit (main ECU) having a top level algorithm evaluates and controls the overall strategy (logic) for vehicle dynamics such as traction control, stability control, body motion control, etc. The remaining subsystems (both ECU and hardware), and sub-algorithms that may be located within the top level electronic control unit, or elsewhere, serve as secondary units that perform several main functions.

In further accordance with the present invention, a first function of the subsystems is to be responsible to control its own actuation dynamics particular to its own hardware/electronics in such a way as to have consistent and predictable control application characteristics. A second function is that each subsystem is required to report the status of its operational state back to the main ECU (i.e., to the higher level algorithms responsible for body motion control, traction control, and stability control) as part of the overall diagnostics such that the main ECU can determine the potential effectiveness of each subsystem control unit. A third function is that each subsystem has a communication link to the main ECU wherein it receives priority requests from the main ECU to perform specific control tasks such as brake moment application (in the case of a brake subsystem), drive torque redistribution (in the case of a controllable driveline system), engine torque reduction or addition (as in the case of an engine subsystem), suspension vertical force augmentation (as in the case of an active suspension), front and/or rear wheel steer augmentation (as in the case of an active steer system), etc. This direct link between the main ECU to each subsystem permits conflict resolution and prioritization in the event of conflicts between the sub-algorithms calculating changes to the subsystems. Each subsystem is to maintain it's basic functionality as well as act upon prioritized requests from the main ECU.

In this manner the main ECU manages the overall control strategy and decides which subsystem actuators to control, with what timing and with what authority. Depending on the given situation at hand and the status of the various actuator sets in the total vehicle system, the main ECU may decide to use differing control strategies such as to meet performance characteristics of the total vehicle system as well as maintain control of vehicle stability, traction characteristics and overall body motions.

DETAILED DESCRIPTION OF THE INVENTION

Figure 1:
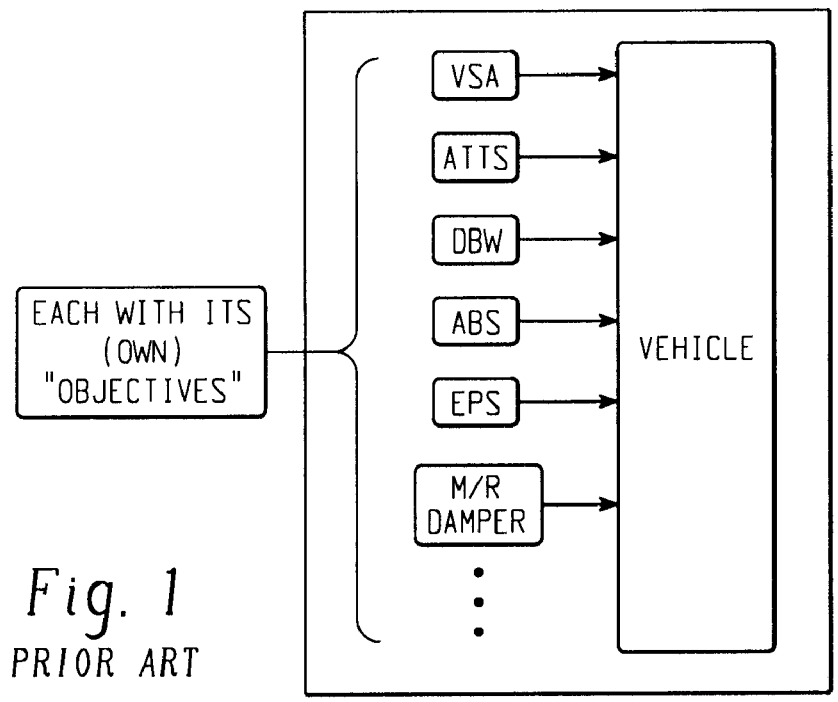
FIG. 1 schematically illustrates a control hierarchy according to the prior art.
Figure 3:
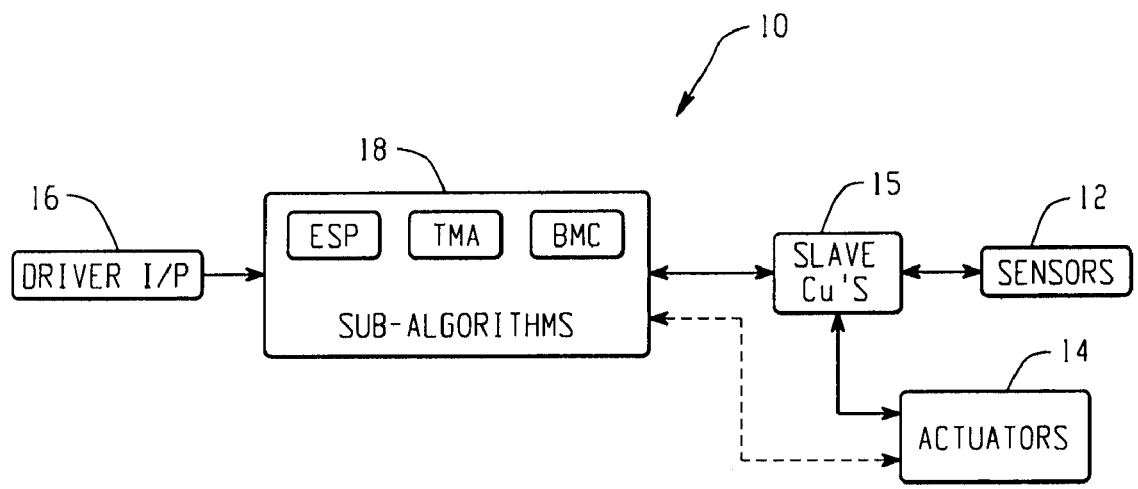
FIG. 3 schematically illustrates a control feedback methodology according to the present invention.

Referring to FIG. 3, an overall vehicle control system 10 is provided that uses the vehicle driver's initial commands and through various subsystems and feedback from subsystem output and sensor data provides superior vehicle control. Sensors 12 provide information regarding the vehicle's operative state. The vehicle control system 10 includes a set of driver generated control inputs 16, a high level controller (HLC) 18, and one or more sub-algorithms. The sub-algorithms are operable, in response to sensed conditions and user input, to actuate slave control units 15. The slave control units 15, which receive signals from a series of sensors 12 and interact with series of actuators 14, respond to the actuation of the control algorithms. The high level controller (main ECU) 18 may incorporate one or more algorithms utilizing feed-forward control to calculate control inputs for various subsystems. Some algorithms are designed to anticipate control situations, and conflicts. This high level algorithm includes, but is not limited to, elements of an Electronic Stability Program (ESP) to control ultimate stability of the vehicle body, a traction management algorithm (TMA) to distribute driving torques in an optimal manner, and a Body Motion Control (BMC) algorithm to manage vehicle body motions and forces at the tire/road contact interface.

As described in more detail below, referring to FIG. 2, the HLC 18 includes or is in electronic communication with one or more vehicle sub-algorithms, for example an Antilock Braking sub-algorithm (ABS) 30, Traction Control sub-algorithm (TCS) 32, Active Yaw Control sub-algorithm (AYC) 34, Vehicle Speed Adjust (a.k.a Cruise Control) sub-algorithm (VSA) 36, Active Torque Transfer sub-algorithm (ATTS) 38, Drive By Wire sub-algorithm (DBW) 40, Electric Power Steering sub-algorithm (EPS) 42, and Active Suspension sub-algorithm (CH-C) 44.

Physically, in a first embodiment of the invention, the HLC 18 includes its high level algorithms as well as all of the sub-algorithms 30-44. Alternatively, in other embodiments, one or more of the sub-algorithms are physically separate (i.e., in the associated slave-control unit 15), and are in electronic communication with the HLC 18.

Figure 2:
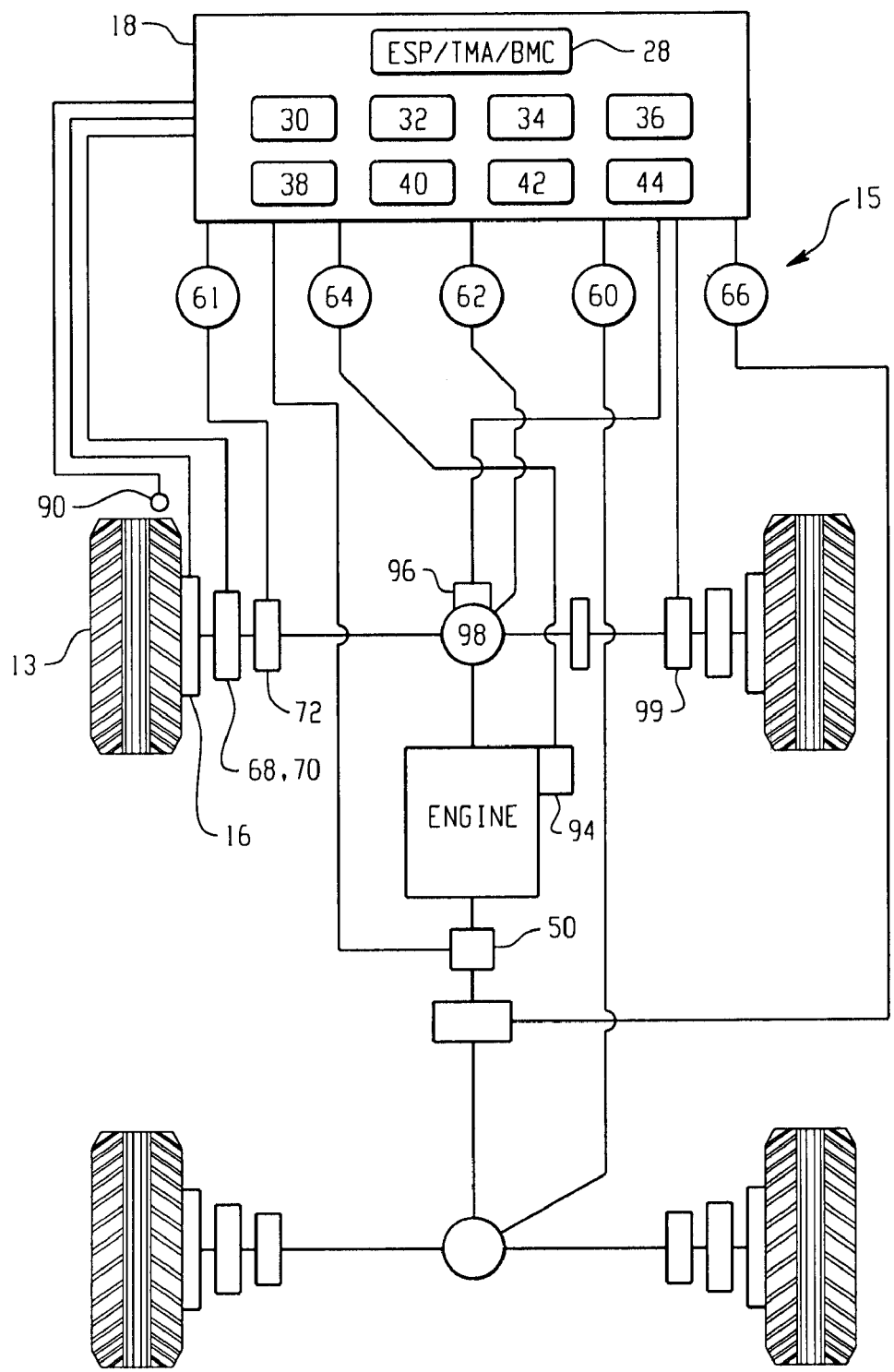
FIG. 2 schematically illustrates a control hierarchy according to the present invention.

Referring to FIG. 2, operation of a high level algorithm in the HLC 18 is illustrated. As described in more detail below, the Electronic Stability Program 28 warehouses input commands, and existent vehicle state information and provides command information to one or more subsystems.

Each high level algorithm has target conditions which it desires to meet to provide superior traction, motion control, etc. in view of the existent vehicle state. The high level algorithm takes into account a number of factors before deciding what commands to provide to the subsystems to meet the target conditions. These factors or variables include: existing and potential conflicts between operating sub-algorithms, the effectiveness of providing additional (or removing) actuation from a subsystem, whether hard intervention (immediate response) or soft intervention (slower response) is acceptable, environmental results of actuating one system over another (excessive noise, etc).

As further described in more detail below, the vehicle includes subsystems with slave electronic control units 15, for example Sla-CUs associated with a Rear Wheel Steering system (RWS) 60, Front Wheel Steering system (FWS) 62, Engine Torque Controller 64, and 4 Wheel Drive Controller (4WD) 66, brake valves 68, brake pumps 70, and drive torque controllers 72. Each subsystem receives control signals from the HLC (i.e., from the sub-algorithms and higher level algorithms) and sends electronic signals back to the HLC 18 indicative of the status of the actuators and the sensed or measured conditions. The subsystem is preferably able to operate such that, when signals are received by the subsystem, the subsystem will respond by actuating or ceasing actuation of one or more associated actuators. The subsystem also sends signals to the HLC 18 indicating whether the instructions have been or are being followed successfully. As noted, each subsystem is required to perform a basic function on the basis of minimum sensor information and can operate independently from the high level control algorithm and sum-algorithms, if required.

Referring to FIG. 3, at the input level, a driver prescribes various control inputs 16 such as steering wheel angle, brake pedal position, throttle position etc., in an attempt to create vehicle motion, or to change the operating state of the vehicle. These control inputs 16 are interpreted by the HLC 18 as a command for vehicle motion in terms of longitudinal acceleration and lateral acceleration.

In the embodiment where the HLC 18 is a stand alone module, an additional degree of redundancy is added to the vehicle control system. If one of the separate modules housing a sub-algorithm fails or performs in a degraded manner, the HLC 18 compensates by providing additional commands to the appropriate subsystems. Similarly, if the HLC algorithm fails or performs in a degraded manner, it can be turned off and the individual sub-algorithms may function independently.

From vehicle sensor information, the actual operational state information is compared to the driver's intent and processed by the high level algorithm. This high level algorithm determines, based on the existent set of control requests from vehicle subsystems and the current vehicle state information, what combination(s) of subsystems and actuators within the subsystems is most efficient and least interventive to achieve the driver's intended acceleration commands as interpreted from his control inputs.

The HLC 18 manages the overall control strategy and decides which subsystems to control, with what timing and with what authority. Depending on the given situation at hand and the status of the various actuator sets in the total vehicle system, the HLC 18 may decide to use differing control strategies such as to meet performance characteristics of the total vehicle system as well as maintain control of vehicle stability, traction characteristics and overall body motions.

The HLC 18 may receive conflicting commands from two of the sub-algorithms, for example a first algorithm requesting additional torque at the right front wheel, and another algorithm requesting less torque at the right front wheel. In contrast to systems that simply give one of the algorithms priority over the other, the HLC 18 is able to recognize the requests of each and provide resolution instructions that resolve the conflict based on predetermined logic.

The high level algorithm may recognize conflicts within sub-algorithms at one or more levels. In a simplest form, the high level algorithm recognizes conflicting requests for changes to the same parameter, such as torque applied at an individual wheel. The high level algorithm may resolve this conflict by simply summing the values (some of which may be negative, resulting in subtraction) of the requests and generating resolution instructions that are the summation result. Alternatively, the high level algorithm may include only a certain percentage of the requested change of each sub-algorithm in the resolution instructions as dictated by predetermined logic. The high level algorithm may ignore some or all of the instructions of a particular sub-algorithm for a particular subsystem and instead provide resolution instructions to a different subsystem that may be able to provide like or similar results.

On a larger scale example the high level algorithm may be required to determine the most effective combination of subsystem actuation to minimize or eliminate wheel slippage under certain operating conditions. Wheel slip is typically eliminated by making changes to wheel torque globally, or variations at wheels individually, or through application of the brakes. In this example, the high level controller may determine that global torque reduction is not the most preferred manner of eliminating slippage because of a conflict wherein the driver has already requested additional torque to accelerate the vehicle. The high level algorithm also may determine that both application of the brakes and shifting torque between wheels would both be effective because neither subsystem was currently in a state of actuation. The high level algorithm may also determine that application of the brakes at the existing high speed would be a hard, sudden intervention and at this time such an intervention was not desired. However, the high level algorithm may determine that torque shifting would be a soft and desirable type of intervention. The high level algorithm may also determine that globally reducing torque through the engine throttle would also produce undesirable sound effects. As a result, in this example, the high level algorithm determines that changes to eliminate wheel slip should be made exclusively or predominantly through the individual wheel torque shifting subsystem.

Referring to FIG. 2, the vehicle control system 10 includes and utilizes a number of existing vehicle subsystems in order to efficiently control undesirable vehicle phenomena. Each subsystem is required to perform its basic function on the basis of minimum sensor information and, thus, can operate independently from the HLC 18, if required. In general, each actuator within a subsystem is generally driven by its own dedicated slave control unit to achieve a specific function although simple actuators may be driven directly (i.e., without a slave control unit).

Each sub-algorithm controls several subsystems and their Sla-CU, for example the novel TCS subsystem described below controls a Sla-CU 64 for engine torque as well as an individual wheel torque Sla-CUs 61. When the HLC algorithm commands additional function of the various subsystems, these subsystems integrate these additional commands with their basic function and provide overall enhancement to vehicle operation.

Antilock Brake Systems (ABS) are well known in the art and prevent wheel lockup. An ABS Sub-algorithm 30 controls pump and valve actuators (or Sla-CUs) at each individual wheel 13. Specifically, when a wheel speed sensor 90 senses an extreme decrease in wheel speed (i.e. lock-up is occurring) commands are sent to a valve actuator or Sla-CU 68 to release brake pressure. The process is repeated, many times a second, until the wheel speed remains in a desirable range. If the amount of pressure released is too great, commands are sent to a brake pump actuator or Sla-CU 70 in order to increase pressure in the brake lines.

Another vehicle sub-algorithm is the vehicle's Active Yaw Control (AYC). This algorithm helps prevent vehicle spinouts. The AYC sub-algorithm controls a slave controller Sla-CU 64 associated with engine torque control. The engine speed may be varied in order to vary the amount of torque provided from the engine to the wheels. Typically a modulation of engine torque affects wheel torque equally at each wheel. Another Sla-CU 60 controlled by the AYC sub-algorithm 34 is associated with the vehicle's dedicated rear wheel steering actuator. Yet another Sla-CU 62 controlled by the AYC sub-algorithm is associated with the vehicle's dedicated front wheel steering actuator. The brake pump and valve actuators 68, 70 may also be controlled as part of a AYC sub-algorithm 34.

When an undesirable amount of yaw is detected by a yaw sensor 50, a counteracting measure is imposed by the AYC sub-algorithm 34. Actuation of the front wheel steering Sla-CU 62 and/or rear wheel steering Sla-CU 60 correct the amount of yaw by changing the direction of the vehicle. Actuation of engine Sla-CU 64 can reduce the amount of torque at each wheel, thus, reducing yaw forces. Similarly, manipulation of the brake actuators, or the wheel torque Sla-CU 61, can reduce torque at individual wheels 13.

Yet another vehicle sub-algorithm is the vehicle's four wheel drive Traction Control System (TCS). The TCS has the ability to control or modulate the drive torque applied to the wheels 13 individually, as opposed to equally (the result of varying engine torque), to react to sensed wheel-slipping conditions. The TCS sub-algorithm 32 receives signals from wheel speed sensors 90 and from other sensors in the vehicle and determines whether one or more of the wheels 13 is either slipping or about to slip. The TCS sub-algorithm 32 calculates the necessary wheel brake torque (or actuation force), the necessary throttle angle adjustment, and the necessary drive torque reduction amount for the slipping wheel(s).

The TCS sub-algorithms receive information from wheel speed sensors 90 for each wheel, and provide commands to a drive torque actuator 72 associated with each of the wheels 13 via the wheel torque Sla-CU, and the engine sla-CU 64 that is operable to control operation of the engine, namely the throttle angle, to affect engine output torque.

The TCS sub-algorithm 32 is in communication with the brakes 16 for each wheel, and with the drive torque Sla-CU 61 and the engine Sla-CU 64. The drive torque Sla-CU 61 is in communication with the individual drive torque actuators 72. In accordance with the present invention, there are several ways to implement the improved cooperative traction control made possible by independently controlling the individual drive torques for each of the wheels 13.

The vehicle speed adjust system also known as "cruise control" operates to maintain a desired vehicle cruising speed. A dedicated VSA Sub-algorithm 36 controls the vehicle throttle 94 via the engine Sla-CU 64 in order to achieve the desired speed. Then the speed may be raised or lowered in a step wise manner through input of the vehicle driver.

The active torque transfer system operates by distributing engine torque between the front and rear wheels. A dedicated ATTS Sub-algorithm 38 controls drivers or actuators that distribute the torque between the front and rear wheels.

The drive by wire system removes the need for accelerator cables. Motion of the accelerator pedal is sensed by one or more sensors. This motion is translated by a dedicated DBW Sub-algorithm 40 into an electrical signal that is then provided to the vehicle throttle control 94 via the engine Sla-CU 64.

The electric power steering system removes the need for hydraulic steering pumps in steering assist. The system includes electric sensors and a dedicated EPS Sub-algorithm 42 that reads input from the driver and provides control instructions to an electric motor 96 that operates a rack and pinion steering gear 98.

The chassis control system operates by varying the fluid viscosity within a dashpot 99 in a common spring-dashpot system at each vehicle wheel 13. The dashpot 99 utilizes a magneto-rheological system wherein an electrical coil surrounds an area adjacent to a fluid orifice. The fluid within the dashpot 99 contains metal particles that align into fibrous structures when a current is applied to the electrical coil. This alignment increases the resistance of the movement of the fluid through the orifice.

In an example of the high level controller 18 preventing interference between two sub-algorithms, the TCS sub-algorithm 32 in response to sensed wheel slip indicates that a reduction of wheel torque is required. Simultaneously, the AYC sub-algorithm 34 in response to a change in the sensed yaw forces on the vehicle indicates that an increase in the wheel torque is required. Both requests are inputs within one or all of the ESP, TMA, or BMC high level algorithms within the high level controller 18. The high level algorithm recognizes the conflicting instructions and calculates a resultant command. The command is sent via the SLA-CU 61 to the individual wheel drive torque actuators 72.

Any number of sub-algorithms may be contained in a single module. This module is preferably a module originally supplied for ABS, but reprogrammed to act as the HLC and perform the TCS, AYC, etc. sub-algorithm tasks. Any variation or combination of modules may be utilized including having the HLC and all sub-algorithms in a single module, to having all sub-algorithms as well as the HLC in separate modules. Many of the configurations are determined by what subsystems are manufactured by the vehicle manufacturer in contrast to those purchased as stand alone systems from a third party manufacturer. It is simpler to combine sub-algorithms within a common module if the vehicle manufacturer manufactures both of the subsystems to be combined.

The proposed structure provides a high level control algorithm that has a basic control structure that is not based on the particular response characteristics of any single vehicle control sub-algorithm. This allows for the formulation of generalized control methodologies for vehicle control leading to innovation and potential insight for particular actuator sets or sensor set of the future that may not yet exist. Since each subsystem has the capability to provide a minimum function, it can operate without specific instructions from the centralized control algorithm. This provides a benefit because these subsystems can still be applied to chassis systems on lower cost vehicles wherein there is no target application for a centralized control algorithm and the basic hardware and software communication can be maintained without large communication structure changes.

This structure provides benefit in terms of system redundancy. The goal of the centralized algorithm is to provide enhanced functionality to the various actuator sets using information from sensor arrays and status information from all the existent subsystems. If one particular subsystem experiences degraded performance, then another subsystem can be commanded to compensate, thus providing a compensatory approach to achieving the same overall vehicle function. In the event that the centralized control logic has failed or can not command additional function of a particular subsystem actuator, it can turn off and inform the various subsystem actuators of its status; then a particular subsystem can still function so long as all the base information it uses for control is still judged to be useful and valid. This provides a cascaded system of control redundancy.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method for controlling a vehicle, comprising the steps of:
   providing a plurality of vehicle sub-algorithms within the vehicle, each sub-algorithm being associated with a vehicle subsystem and being operable to control at least one particular aspect of vehicle dynamics within the associated vehicle subsystem, wherein at least one sub-algorithm is associated with a wheel torque control subsystem and is operable to control wheel torque;
   providing a high level algorithm in said vehicle, said high level algorithm being operable to monitor an overall operating condition of said vehicle and to mediate potential conflicts between said sub-algorithms;
   collecting information regarding conditions of the vehicle's operative state and providing said collected information to at least one of said sub-algorithms and said high level algorithm;
   generating instructions from said sub-algorithm based on the collected information;
   controlling operation of said vehicle based upon said generated instructions;
   providing the generated instructions from each of the sub-algorithms to the high level algorithm, said high-level algorithm being operable to determine if generated instructions from any of the sub-algorithms are in conflict with generated instructions from another sub-algorithm, wherein instructions from said algorithm associated with a wheel torque control subsystem are instructions to change wheel torque at one or more wheels;
   generating resolution instructions within the high level algorithm to replace any conflicting generated instructions from the sub-algorithms;
   communicating the resolution instructions from the high level algorithm to appropriate ones of said sub-algorithms to appropriately control the associated vehicle subsystem.

2. The method for controlling a vehicle of claim 1, further including inputting driver generated control inputs into the sub-algorithms.

3. The method for controlling a vehicle of claim 2, wherein the resolution instructions sent from the high level algorithm to the sub-algorithms are sent to one or more slave control units within the associated subsystem.

4. The method for controlling a vehicle of claim 2, wherein the vehicle subsystems provide information for input into the sub-algorithms.

5. The method of claim 1, wherein each subsystem has a priority hierarchy of performing a basic function first and responding to the high level algorithm second.

6. The method of claim 1, wherein conflicting instructions from the sub-algorithms are a result of degraded performance within one of the vehicle subsystems.

* * * * *